(12) United States Patent
Uneda

(10) Patent No.: US 6,599,389 B1
(45) Date of Patent: Jul. 29, 2003

(54) ULTRASONIC SEALING DEVICE FOR PACKAGING MATERIAL

(75) Inventor: Noriaki Uneda, Mihara (JP)

(73) Assignee: Furukawa Mfg. Co., Ltd. (JP)

( * ) Notice: Subject to any disclaimer, the term of this patent is extended or adjusted under 35 U.S.C. 154(b) by 197 days.

(21) Appl. No.: 09/856,604

(22) PCT Filed: Aug. 10, 2000

(86) PCT No.: PCT/JP00/05382

§ 371 (c)(1), (2), (4) Date: May 23, 2001

(87) PCT Pub. No.: WO02/14054

PCT Pub. Date: Feb. 21, 2002

(51) Int. Cl.[7] .............................................. B29C 65/08
(52) U.S. Cl. .............................. 156/379.8; 156/380.1; 156/466; 228/1.1; 53/550; 53/575
(58) Field of Search ....................... 156/73.1, 73.4, 156/379.6, 379.8, 380.1, 203, 466; 228/1.1; 53/456, 550, 575, DIG. 2; 493/133, 163, 175, 189, 193, 205, 243, 250

(56) References Cited

U.S. PATENT DOCUMENTS

| 4,410,383 A | 10/1983 | Lipari ........................ 156/73.1 |
| 4,950,345 A | 8/1990 | Kreager, Jr. et al. ......... 156/203 |
| 5,318,657 A | * 6/1994 | Roberts ........................ 156/466 |

FOREIGN PATENT DOCUMENTS

| FR | 2 313 186 | 12/1976 |
| FR | 2 571 639 A1 | 4/1986 |

* cited by examiner

Primary Examiner—Jeff H. Aftergut
Assistant Examiner—John T. Haran
(74) Attorney, Agent, or Firm—Mark Kusner; Michael A. Jaffe

(57) ABSTRACT

A belt-like film 18 is moved along a plate 15 folded to be rectangular in section, so that the film 18 is formed into a continuous tube by a tubular frame of the plate 15. A spring piece 30 having an anvil 31 bulged out therefrom is securely held on the inner side edge 16 of the aforementioned plate 15, and an ultrasonic hammer 32 is located face to face with said anvil 31, so that both side edges of the belt-like film 18 formed into a tube are placed on the anvil 31 to be melded by the ultrasonic vibration of the hammer 32.

2 Claims, 5 Drawing Sheets

ULTRASONIC SEALING DEVICE FOR PACKAGING MATERIAL

TECHNICAL FIELD

The present invention relates to a device not only for rounding a belt-like film into a tube along its length direction, but for melding overlapped edges on both sides of said tubular film by ultrasonic vibration in order to form a plurality of packaging bags.

BACKGROUND ART

In the conventional device which effects melding of overlapped parts of both side edges of a film rounded to be tubular by heat generated by ultrasonic vibration, as shown in FIG. 7, two overlapping sheets of film 13 are moved in the direction of arrow 14 between a vertically vibrating hammer 10 and an anvil 12 securely held on the frame 11, thereby to continuously meld the film 13 by vibration heat induced by the hammer. However, because of subtle variations in the thickness of the aforementioned film 13, its melding strength varies from area to area, threatening to cause air leak when vacuum packaging is carried out, for example.

DISCLOSURE OF INVENTION

It is therefore an object of this invention to form a tubular film having a uniform strength by averaging the vibratory impact force to be applied onto the film.

The present invention provides a sealing device comprising a means for moving a belt-like film along a tubular plate having both side edges thereof folded to overlap one upon another as if at a kimono's neck part, thereby to form the film into a continuous tube, following the sectional profile of this tubular plate, wherein an anvil is formed on one end of a spring piece, the other end of which is fixedly set on one side edge of the aforementioned overlapped part of the tubular plate, the overlapped portion of the tubular film may be melded by the cooperation of the aforementioned anvil and a movable hammer which applies an ultrasonic vibratory impact on said anvil.

Further, the present invention provides a sealing device comprising a means for moving a belt-like film along the inner surface of a tubular plate so folded as to form a continuous slit between both side edges thereof, thereby to form said film into a continuous tube, following the sectional profile of this tubular plate, wherein one end of a spring piece is fixedly set to a base block immovably held on one of the sides sandwiching the aforementioned slit, and an anvil is formed on the other end of said spring piece, so that clasped-hands like edges of the tubular film which are thrust out from the aforementioned anvil may be melded by the cooperation of the aforementioned anvil and a movable hammer which applies ultrasonic vibratory impact on said anvil.

BEST MODE FOR CARRYING OUT THE INTENTION

Figure 1:
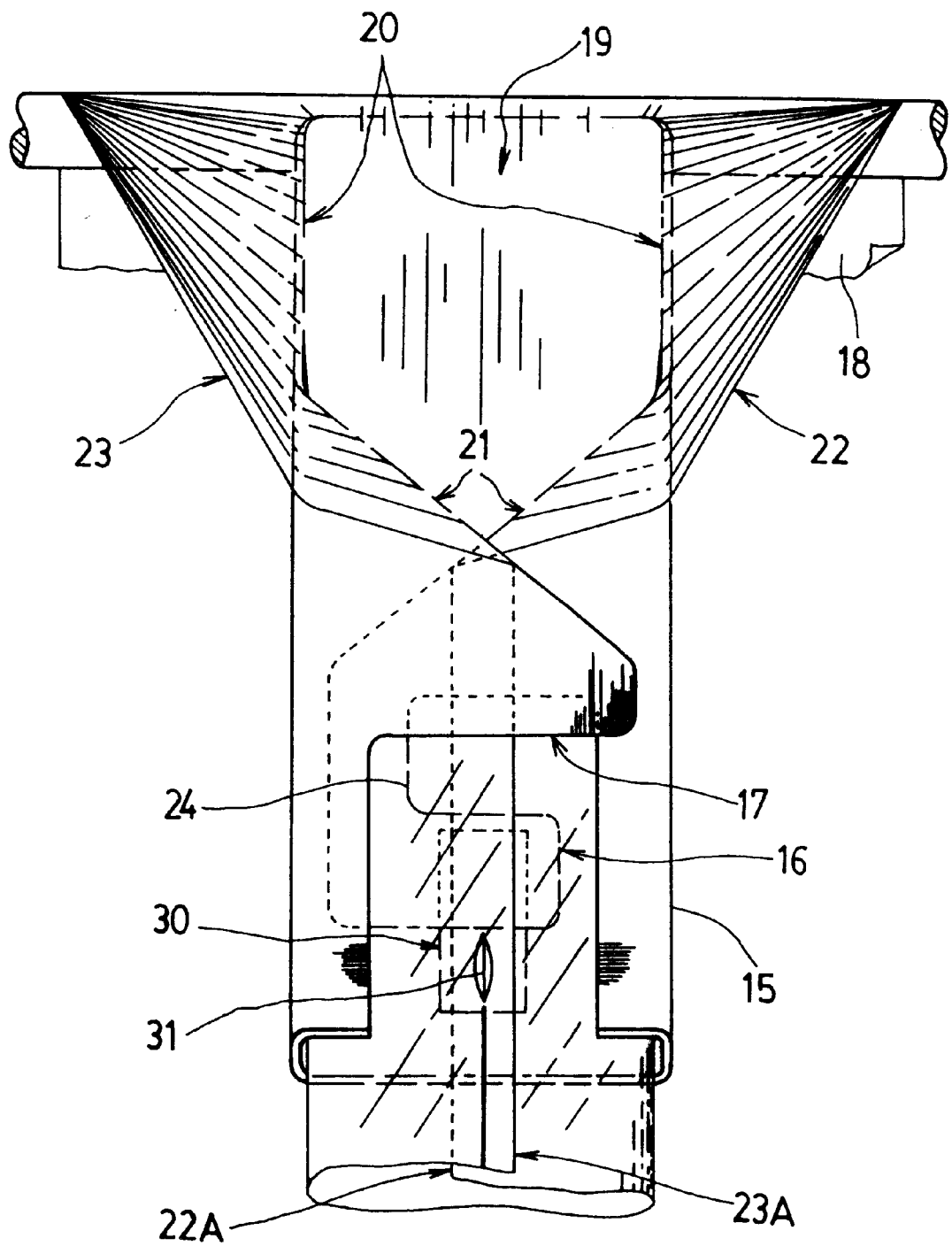
FIG. 1 is a bottom view of a sealing device according to an embodiment of the invention.
Figure 2:
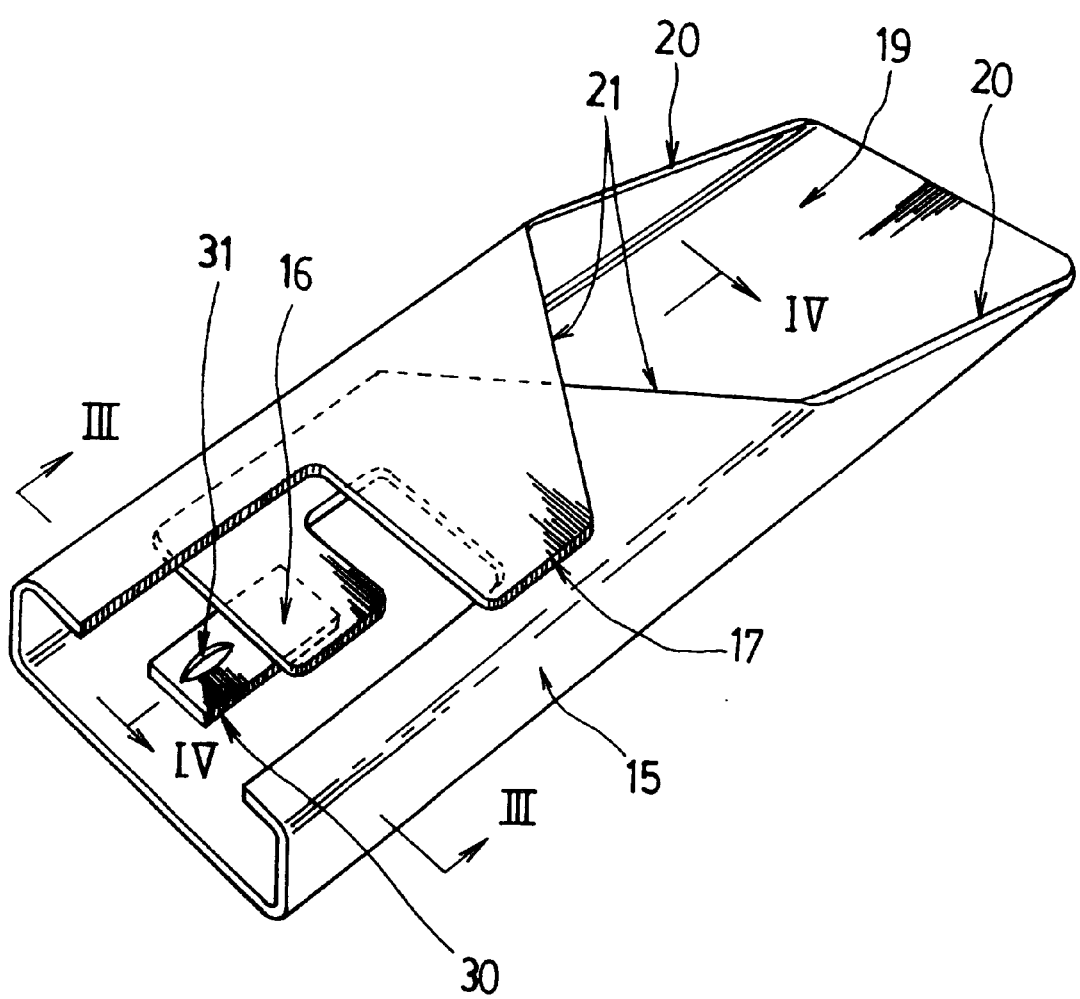
FIG. 2 is a perspective view of the device.
Figure 3:
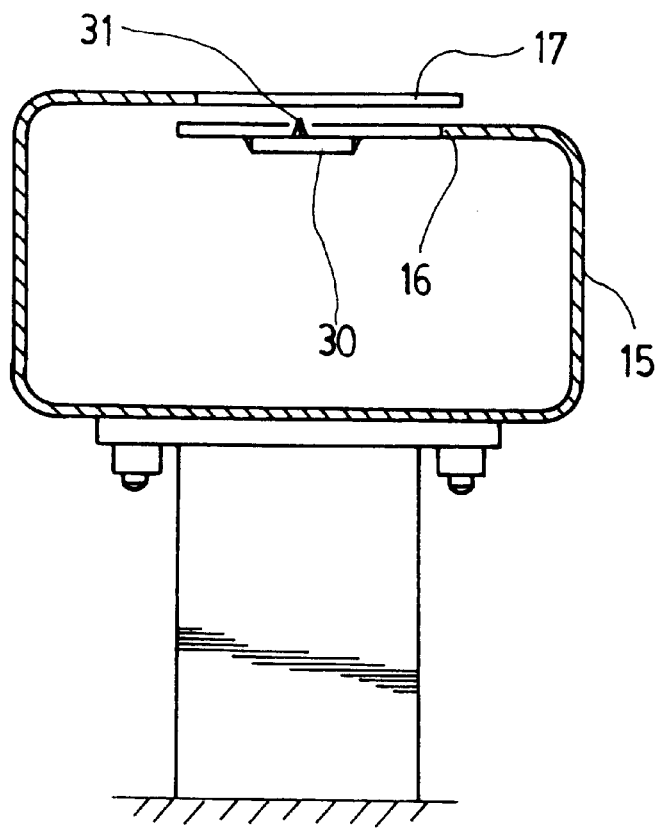
FIG. 3 is a sectional view of the device along the line III—III in FIG. 2.

As shown in FIG. 1 and FIG. 2 which is a perspective view of FIG. 1, a plate 15 tubularly folded to be rectangular in section is not only overlapped at two side edges 16 and 17 thereof with one upon the other as if at a kimono's neck part, but has inclined edges 20 and a V-shape edge 21 provided at the entrance 19 for a belt-like film 18 in order to reduce resistance accompanying said film's access thereto. With this arrangement, one side edge 22 of the film 18 which is drawn out along said tubular plate 15 passes under the inner side edge 16, and the other side edge 23 passes under the outer edge 17. However, in this instance, as a part of the inner edge 16 is stealthily notched as at 24, the one side edge 22 of the film is led out upward through this stealthily notched part 24. As a result, two side edges 22A and 23A are overlapped as if at a kimono's neck part at a position where they come out from the aforementioned stealthily notched part (see also FIG. 4).

Figure 4:
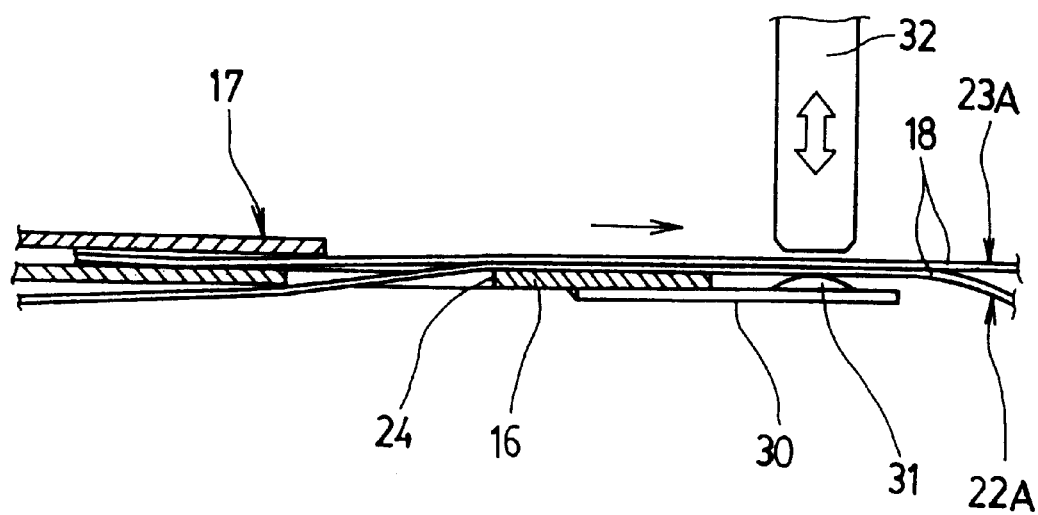
FIG. 4 is a sectional view of the device taken along the line IV—IV in FIG. 2.

Further, one end of an elongated rectangular spring piece 30 is securely held on the inner surface of the central portion of the inner side edge 16 of the aforementioned tubular plate, while a grain-of-rice shape anvil 31 is bulged out from the other free end of said spring piece and an ultrasonic hammer 32 is located face to face with said anvil 31, as shown in FIG. 4. When ultrasonic vibration of the aforementioned hammer 32 is acted upon the anvil 31 through the film, the film melds to form a tubular shape due to heat produced by this vibration. In this instance, the aforementioned spring piece 30 is flexible, so that even if the film 18's thickness is more or less uneven, vibratory impact is uniformly applied on the film owing to the flexibility of the spring piece, thereby equalizing the meld strength.

According to the description of the embodiment represented by FIGS. 1 through 4, the belt-like film 18 is formed into a tube by drawing it downward from the tubular plate 15, however it is also possible to turn round a tubular film for 180 degrees and lead the film downward from above. This attests to its inverse operability, as in the following embodiment.

Figure 5:
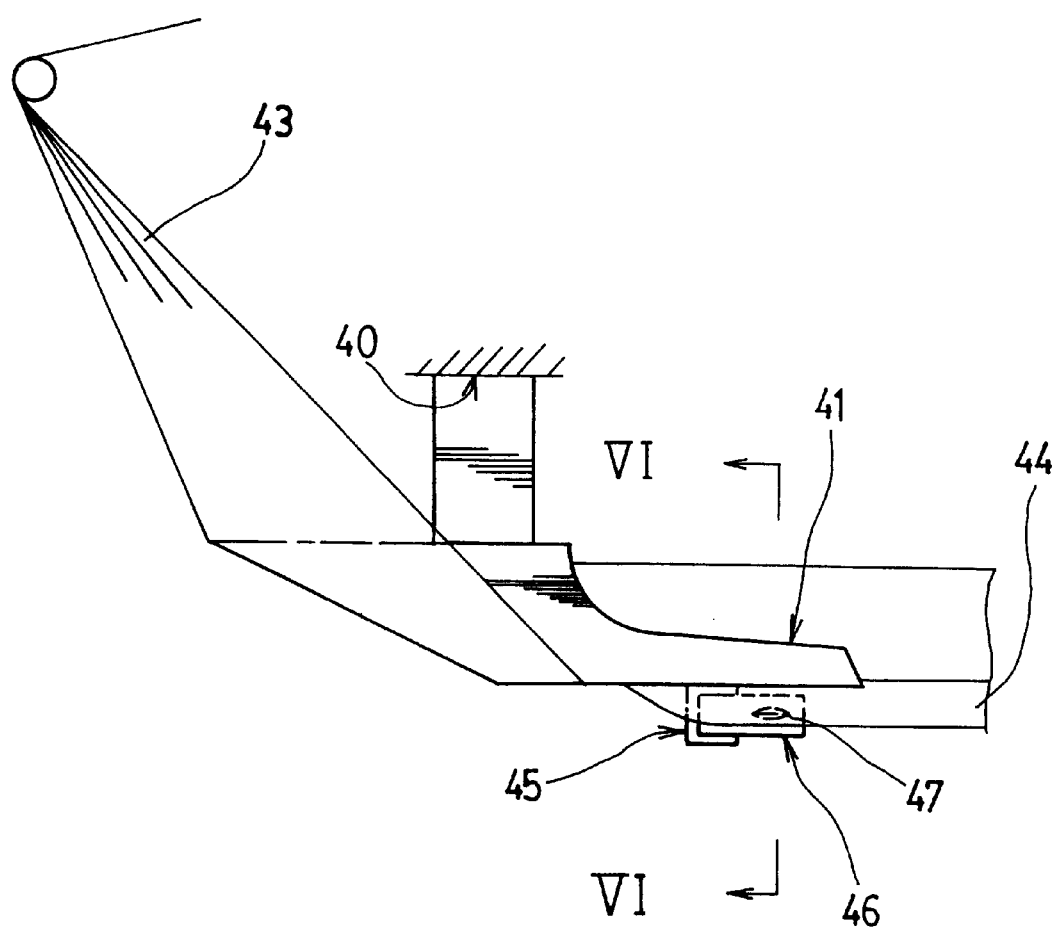
FIG. 5 is a side view of a sealing device according to a second embodiment of the invention.
Figure 6:
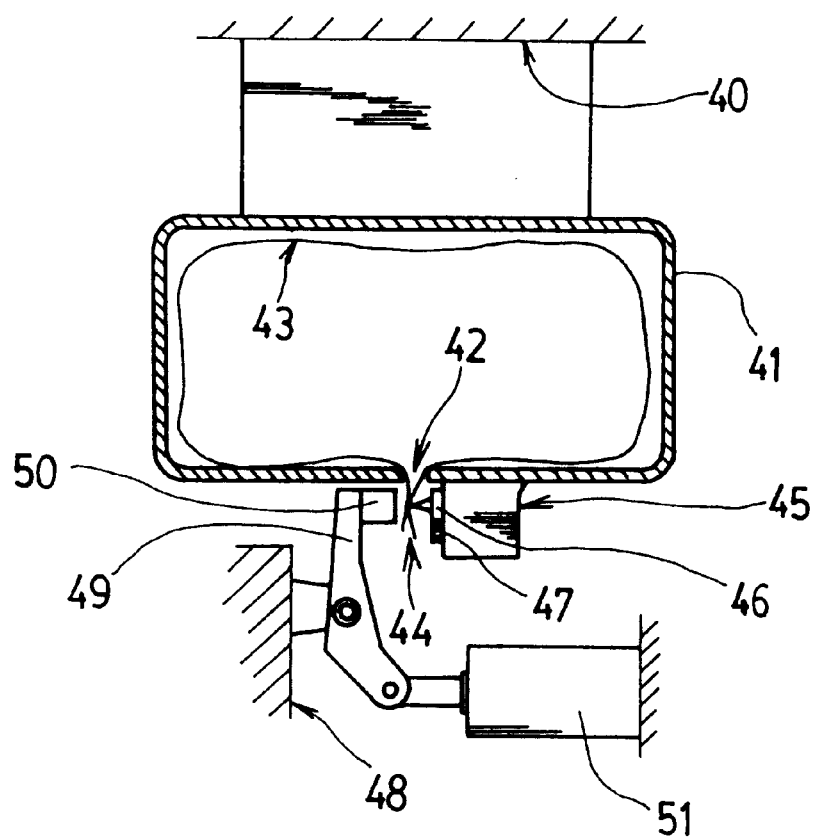
FIG. 6 is a sectional view of the device taken along the line IV—IV in FIG. 5.
Figure 7:
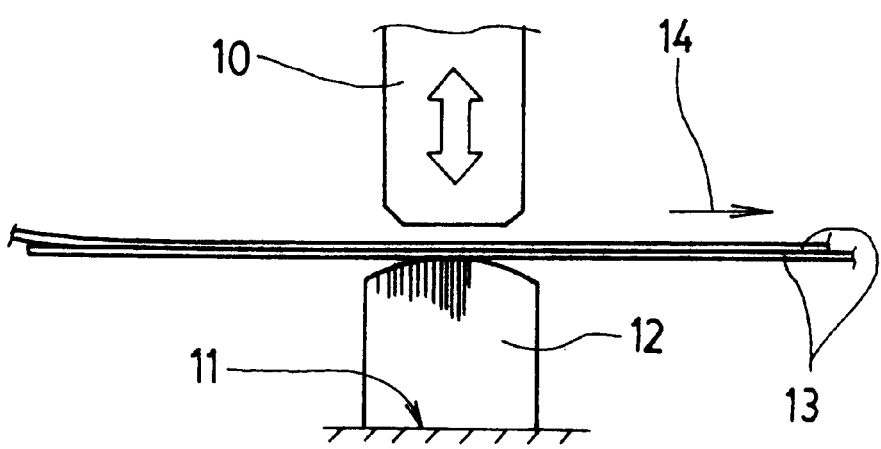
FIG. 7 is an explanatory diagram showing a prior art.

As shown in FIGS. 5 and 6, a tubular plate 41 affixed to a frame 40 has a contiguous slit 42 formed along the center line of the bottom thereof. A belt-like film 43 is led down from above, and its two side edges 44 are rounded, while being thrusted out in the form of clasped hands through the aforementioned slit 42.

On the bottom surface of the aforementioned tubular plate, there is hung a base block 45 from one of the sides sandwiching the aforementioned slit 42. Said base block is affixed with an elongated rectangular spring piece 46 affixed at one end thereof, and an anvil 47 is bulged out from said spring piece at the other end thereof. On the other hand, a hammer 50 of a bell crank 49 supported on the frame 48 is placed face to face with the aforementioned anvil 47, and the aforementioned bell crank is coupled to a vibrator 51. When vibration is acted on the anvil through the hammer 50 by the power from the aforementioned vibrator 51, the clasped-hands shape portion of the film thrusted out through the slit 42 is moved while being continuously melded.

It should be noted that the objective may alternatively be achieved by securing the aforementioned base block 45 on the frame in an immovable state instead of on the tubular plate 41. Further, the respective spring pieces in both embodiments shown in FIGS. 1 and 6 may be made by using other materials than those specified exclusively for springs, as far as the used material has such an elasticity that the spring pieces would not be deformed by the vibration amplitude of the hammer, because the amplitude is very small.

What is claimed is:

1. A sealing device comprising:

a tubular plate having two side edges thereof folded to overlap one upon another as if at a kimono's neck part;

a means for moving a belt-like film along the tubular plate following a sectional profile of the tubular plate to form the film into a continuous tube;

a spring piece with one end fixedly set on one side edge of the aforementioned overlapped part of the tubular plate, and an anvil formed on the other end of the spring piece for melding an overlapped portion of the tubular film in cooperation with a movable hammer which applies ultrasonic vibratory impact on the anvil.

2. A sealing device comprising:

a tubular plate so folded as to form a continuous slit between two side edges thereof;

a means for moving a belt-like film along an inner surface of the tubular plate following a sectional profile of the tubular plate to form the film into a continuous tube;

a spring piece with one end fixedly set to a base block immovably held on one of the sides of the tubular plate sandwiching the aforementioned slit; and an anvil formed on the other end of the spring piece for melding clasped-hands like edges of the tubular film which are thrusted out from the aforementioned slit in cooperation with a movable hammer which applied ultrasonic vibratory impact on said anvil.

* * * * *